(12) United States Patent
Jian (10) Patent No.: US 7,103,184 B2
(45) Date of Patent: Sep. 5, 2006

(54) SYSTEM AND METHOD FOR SIGN MASK ENCRYPTION AND DECRYPTION

(75) Inventor: Jian-Ming Jian, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 10/141,724

(22) Filed: May 9, 2002

(65) Prior Publication Data

US 2003/0210785 A1 Nov. 13, 2003

(51) Int. Cl.
*H04N 7/167* (2006.01)
*H04L 9/14* (2006.01)
*H04N 7/025* (2006.01)

(52) U.S. Cl. .................. 380/205; 380/206; 380/210

(58) Field of Classification Search .............. None
See application file for complete search history.

(56) References Cited

U.S. PATENT DOCUMENTS

| 3,610,828 | A | * | 10/1971 | Girard et al. ............... 380/260 |
| 4,800,590 | A | | 1/1989 | Vaughan |
| 5,367,572 | A | | 11/1994 | Weiss |
| 5,590,194 | A | | 12/1996 | Ryan |
| 5,592,553 | A | | 1/1997 | Guski et al. |
| 5,727,064 | A | * | 3/1998 | Reeds, III .................. 380/270 |
| 5,802,176 | A | | 9/1998 | Audebert |
| 5,825,879 | A | | 10/1998 | Davis |
| 5,852,472 | A | | 12/1998 | Prasad et al. |
| 5,862,150 | A | | 1/1999 | Lavelle et al. |
| 5,892,899 | A | | 4/1999 | Aucsmith et al. |
| 6,005,940 | A | | 12/1999 | Kulinets |
| 6,167,136 | A | | 12/2000 | Chou |
| 2002/0199110 | A1 | * | 12/2002 | Kean ........................ 713/189 |

FOREIGN PATENT DOCUMENTS

| EP | 0127382 | * 12/1984 |
| WO | WO/99/19822 | 4/1999 |

OTHER PUBLICATIONS

Stallings, William. "Public-Key Cryptography and RSA." Cryptography and Network Security- Principles and Practices. Upper Saddle River, NJ: Prentice Hall, 2003. 268-278.*

* cited by examiner

Primary Examiner—Gilberto Barron, Jr.
Assistant Examiner—Venkat Perungavoor
(74) Attorney, Agent, or Firm—Blakely, Sokoloff, Taylor & Zafman LLP (57) ABSTRACT

In general, one embodiment of the invention involves a method to protect the integrity of the sign mask. The method involves computing a key shared by a plurality of software modules employed within an image display device and encrypting a sign mask with the shared key. The sign mask is used for scrambling a bit stream prior to its transmission along with the encrypted sign mask. The encrypted sign mask is decrypted at the destination in order to descramble the scrambled bit stream.

22 Claims, 6 Drawing Sheets

SYSTEM AND METHOD FOR SIGN MASK ENCRYPTION AND DECRYPTION

FIELD

Embodiments of the invention relate to the field of content security, in particular, to a system and method for obfuscating sign masks used to enhance content protection.

GENERAL BACKGROUND

For many years, there has been a growing demand for electronic systems that provide visual and/or audible content to consumers. Previously, content providers have supplied consumers with content in a variety of forms (e.g., vinyl records, audio cassette tapes, video cassette recorder "VCR" tapes, etc.). When played back in an analog format, the content is somewhat protected at that time. For example, analog content is troublesome to illicitly copy and redistribute. Also, the recorded copies have poorer image or sound quality than the original content.

Over the last few years, there has been a growing demand for and use of digital content. For instance, digital versatile disks (DVDs) are an optical disc technology that is expected to rapidly replace the CD-ROM discs over the next few years. A DVD digitally stores content (e.g., Motion Picture Experts Group-2 "MPEG-2" file), and during use, the content is retrieved, processed and converted into an analog format just prior to playback.

One concern experienced by content providers is that computers are now being manufactured with DVD-RAM drives that enables data to be written on a DVD. As a result, content may be retrieved from a DVD, temporarily stored in its digital format, and subsequently rewritten on a new DVD. Thus, copies with the same images and/or sound quality as the master may be illegally reproduced and sold.

In order to protect content providers from unauthorized copying and distribution of their digital content, a data scrambling scheme is performed during playback decoding of the DVD in order to avoid extraction of unmodified digital content. In particular, the bit streams retrieved from sectors of the DVD are scrambled by the DVD playback application and the scrambled bit streams are transferred to a driver software. The driver software performs descrambling operations on the scrambled bit streams. This enables recovery of the original bit streams before transmission to the graphics hardware to decode and display the images.

The data scrambling scheme involves the application of a sign mask to each block of the bit stream. More specifically, bits of the sign mask are Exclusively OR'ed (XOR'ed) with signed bits of DCT coefficients partially forming the block. Thereafter, the sign mask is transferred from the DVD playback application to the driver software for later use to descramble and recover the original bit stream.

One disadvantage with this content protection mechanism is that the data scrambling scheme can be circumvented if a third party obtains the particulars of the sign mask, which is transferred in the clear between the DVD playback application and the software driver. This threat may impede further expansion of digital content distribution.

BRIEF DESCRIPTION OF THE DRAWINGS

The invention may best be understood by referring to the following description and accompanying drawings that are used to illustrate embodiments of the invention, In the drawings.

DETAILED DESCRIPTION

Embodiments of the invention relate to a system and method for obfuscating sign masks used during a data scrambling scheme in order to protect content. Such obfuscation improves security of the system as well as the secured nature of the content.

In the following description, numerous specific details are set forth. However, it is understood that embodiments of the invention may be practiced without these specific detail.

In the following description, some terminology is used to describe certain characteristics of the invention as well as cryptographic functionality. For example, "content" generally includes data perceived by consumers such as video, images and/or audio. A "link" is defined as an information-carrying medium (e.g., electrical wire, optical fiber, cable, bus trace, etc.) or wireless communications through established techniques such as infrared (IR) and radio frequency (RF) signaling.

In one embodiment, an "image display device" is an electronic product having logic with graphics processing capability. Examples of an image display device include, but are not limited to, a computer (e.g., desktop, laptop, handheld, server, mainframe, etc.), a set-top box, a game console, consumer electronic equipment (e.g., compact disc "CD" or digital versatile disk "DVD" player, television, etc.), or the like.

The internal logic of the image display device may include hardware, firmware, software module(s) or any combination thereof. A "software module" is a series of instructions that, when executed, perform a certain function. Examples of a software module include an operating system, an application, an applet, a program or even a routine. One or more software modules may be stored in a machine-readable medium, which includes but is not limited to an electronic circuit, a semiconductor memory device, a read only memory (ROM), a flash memory, a type of erasable programmable ROM (EPROM or EEPROM), a floppy diskette, any optical disk (e.g., CD or DVD), a hard disk, or the like.

With respect to cryptographic functionality, a "key" is information used by a cryptographic function for encryption and decryption. Examples of cryptographic functions may include, but are not limited or restricted to any symmetric key cryptographic functions such as Data Encryption Standard (DES).

Figure 1:
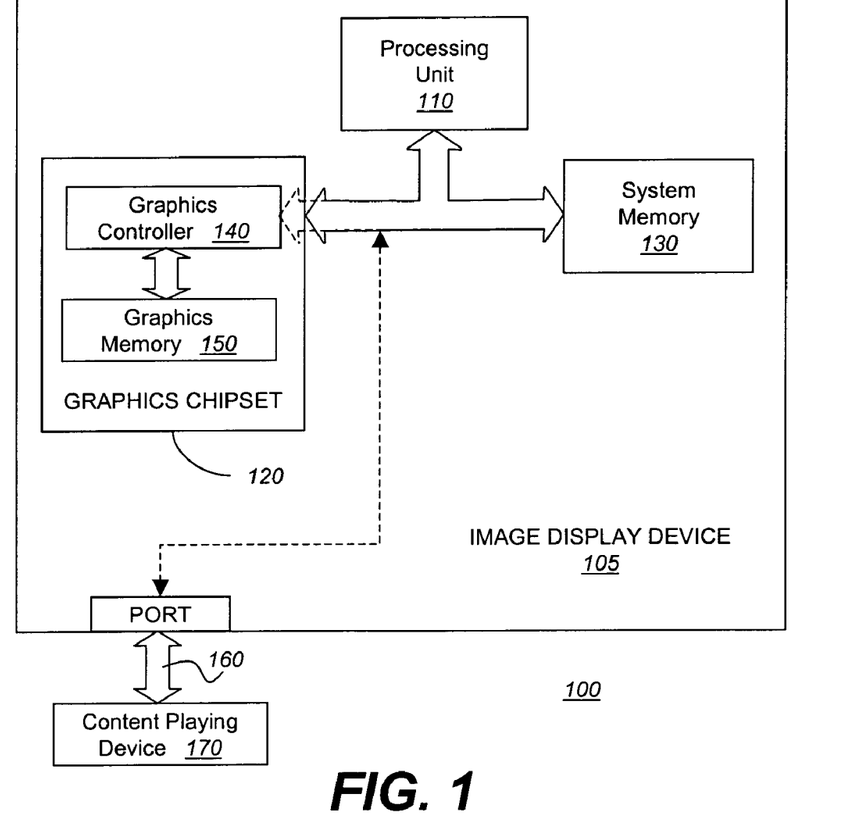
FIG. 1 is an exemplary embodiment of an electronic system utilizing the invention.

Referring to FIG. 1, an exemplary embodiment of a system 100 utilizing the invention is shown. In this embodiment of the invention, system 100 features an image display device 105 comprising a processing unit 110 (e.g., microprocessor, digital signal processor, application specific integrated circuit, microcontroller, etc.) in communication with a graphics chipset 120 and system memory 130. Graphics chipset 120 comprises a graphics controller 140 capable of accessing information stored within graphics memory 150.

Graphics memory 150 may be separate from graphics controller 140 or on-chip. One example of graphics chipset 120 is the INTEL® 830™ chipset.

System 100 further comprises a link 160 that enables data to be transferred between the image display device 105 and a content playing device 170 (e.g., a peripheral DVD player, integrated DVD drive, a peripheral CD player, integrated CD drive, etc.). The content playing device 170 may be integrated into image display device 105 or configured as an independent peripheral as shown. In this embodiment of the invention, link 160 may be adapted for coupling content playing device 170 to a port of image display device 105. The port operates as a conduit for the incoming content to be subsequently routed through internal logic 210, 220 and 230 of image display device 105.

Figure 2:
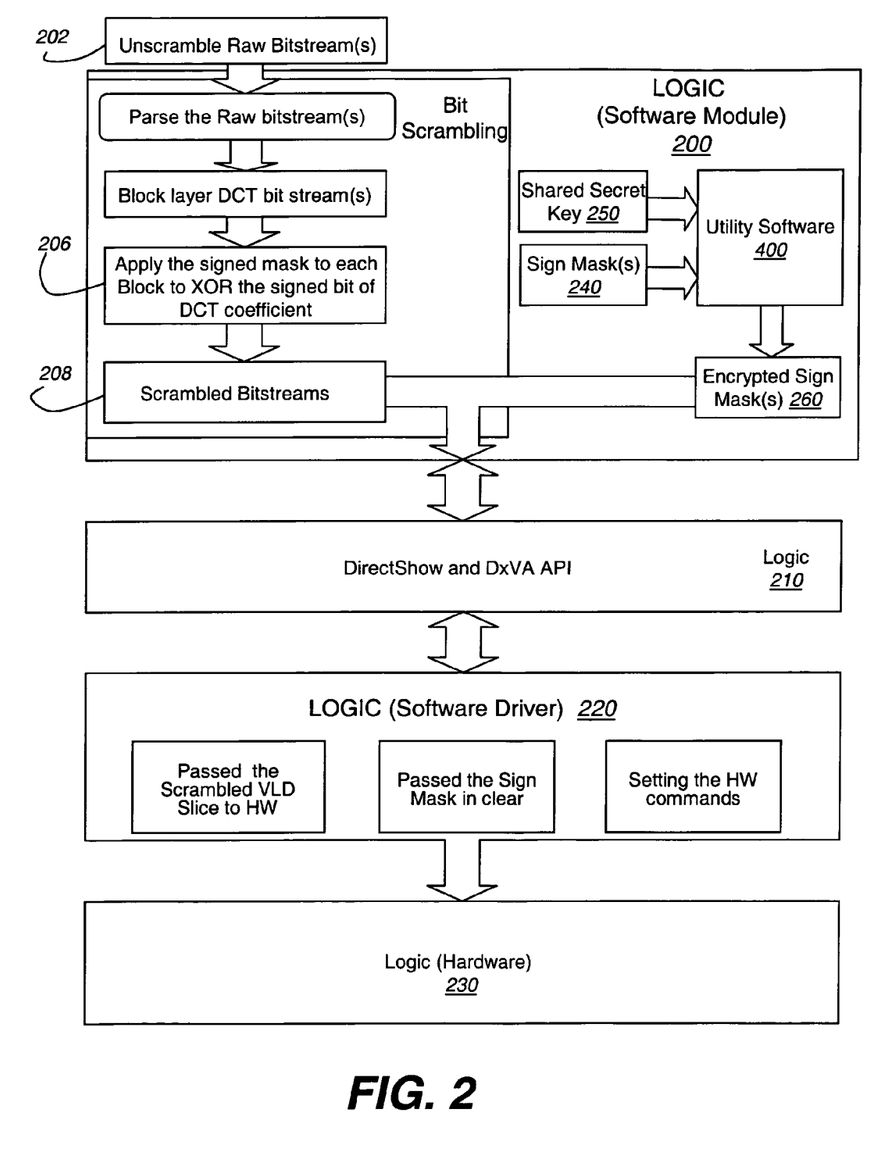
FIG. 2 is an exemplary embodiment of communications between various units of the electronic system of FIG. 1.

Referring now to FIG. 2, an exemplary embodiment of communications between logic 200, 210, 220 and 230 associated with image display device 105 of FIG. 1 is shown. Herein, for this embodiment of the invention, logic 200 is a software module processed by image display device 105. The software module 200 is configured to retrieve stored digital content from a machine-readable medium and produce scrambled bit streams that are routed to a software driver (e.g., logic 220) and descrambled. It is contemplated, however, that software module 200 may be configured to produce scrambled bit streams that are routed directly to logic 230 (e.g., hardware such as graphics chipset 120 of FIG. 1) in lieu of software driver 220.

In one embodiment of the invention, software module 200 is a DVD playback application that retrieves unscrambled (raw) bit streams 202, perhaps stored on the DVD in a compressed format using Discrete Cosine Transform (DCT) coefficients such as any type Motion Picture Experts Group compression (e.g., MPEG-2, MPEG-4, etc.). Of course, bit streams 202 may be initially encrypted and thus require decryption. For illustrative sake, considering raw bit streams 202 as MPEG-2 bit streams, they undergo parsing operations to convert the MPEG-2 bit streams 202 into block layer DCT bit streams 352 as shown in FIG. 3B.

Figure 3A:
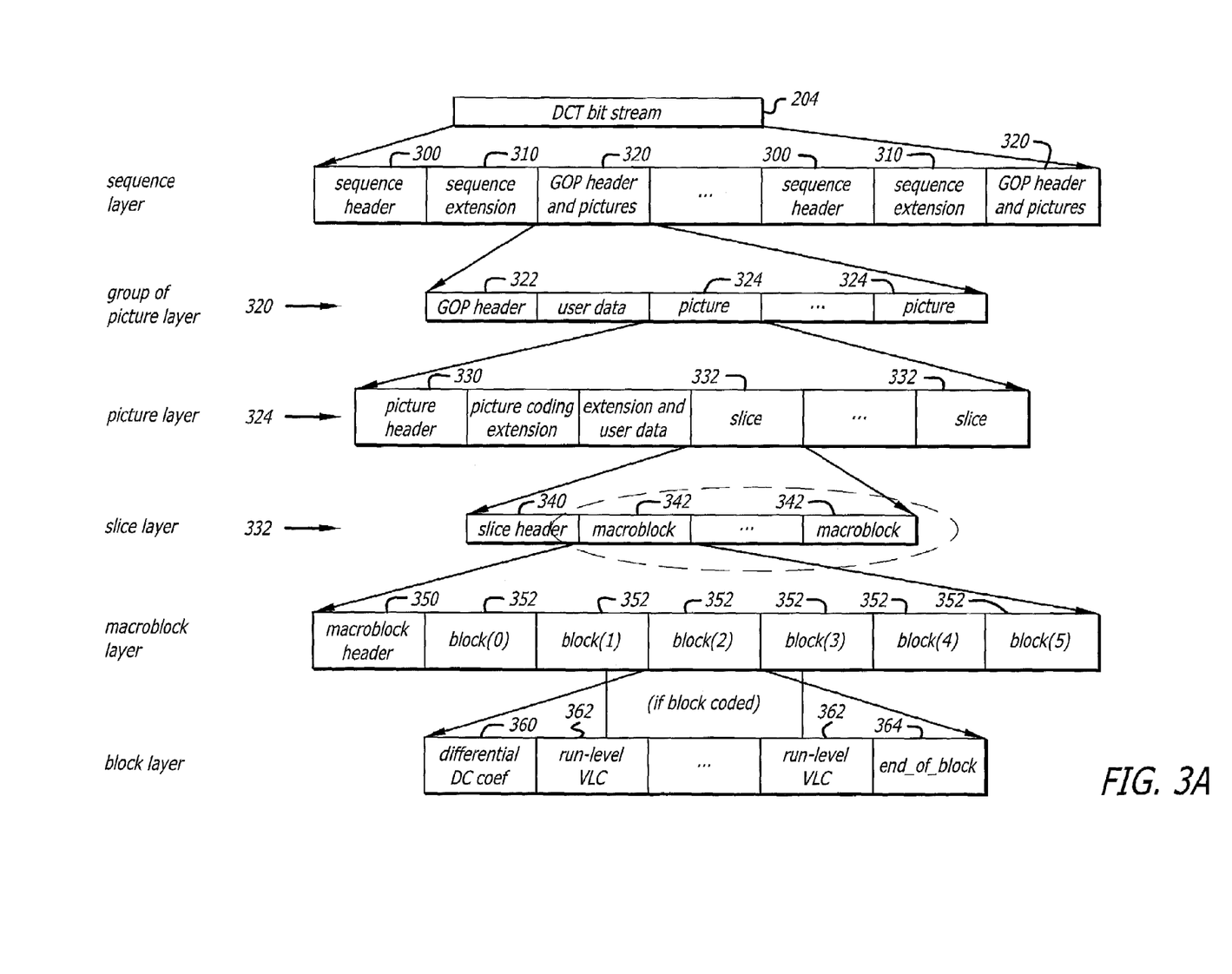
FIGS. 3A and 3B are exemplary embodiments of the layered structure of the scrambled bit stream.
Figure 3B:
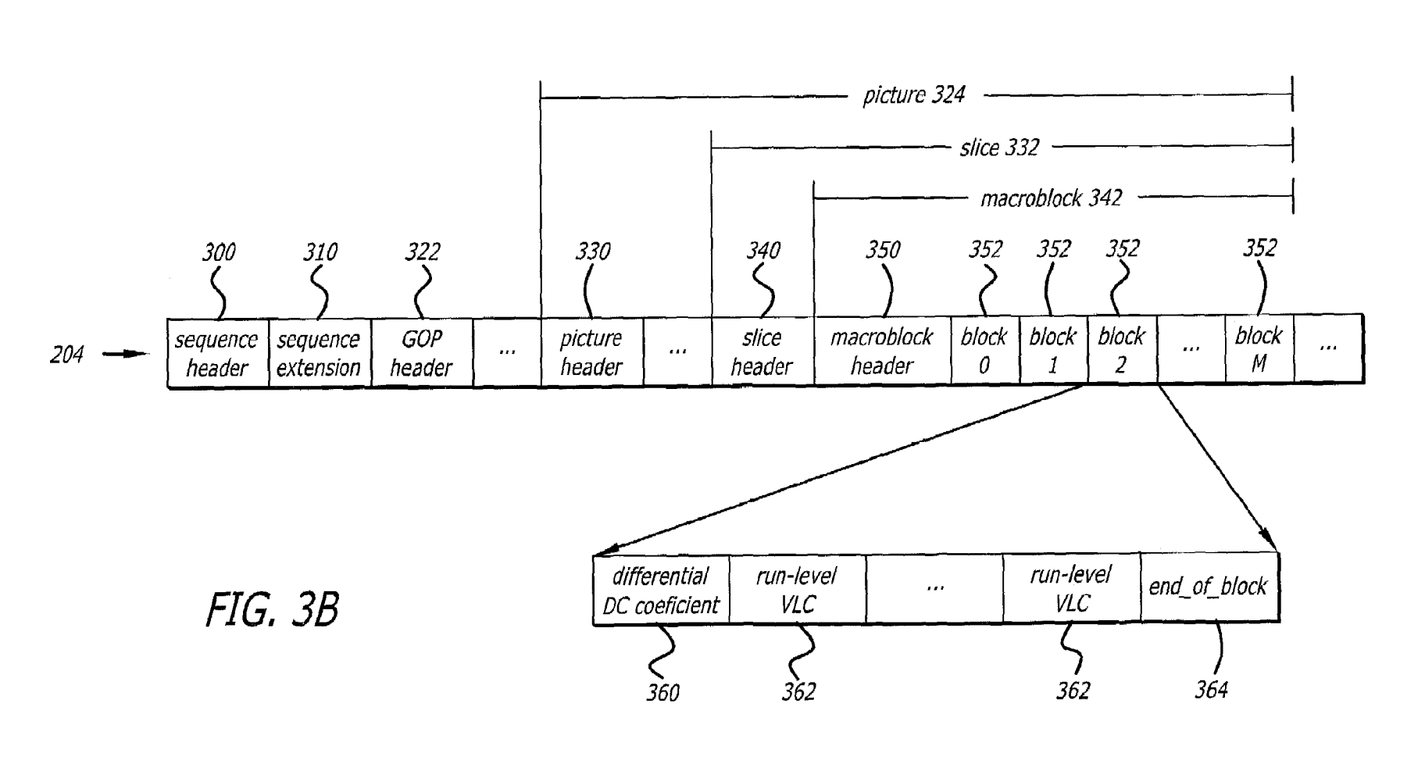

Referring to FIGS. 3A and 3B, each raw bit stream 202 comprises one or more sequence header(s) 300, a sequence extension(s) 310 and Group of Pictures (GOP) header and pictures 320. For this illustrative embodiment of the invention, the sequence header 300 provides encoding and display parameters such as horizontal size (in pixels), vertical size (in pixels), aspect ratio, bit rate and/or frame rate for example. The sequence extension 310 provides profile and level constraints as well as extension values for many display parameters.

The GOP header and pictures 320 includes a GOP header 322 followed by one or more pictures 324. Equivalent to a frame of data being displayed or stored, each picture 324 includes a picture header 330 and one or more slices 332 collectively forming a frame of data. The picture header 330 features data that identifies how the picture 324 is coded. For example, the picture 324 may be coded as an "Intra" picture (I_picture) having no reference to any other picture. Alternatively, the picture 324 may be coded as either a "Predicted" picture (P_picture) or "Bi-directional" picture (B_picture). A "P_picture" may reference another picture and can be used as a reference for other pictures. A "B_picture" may reference two different pictures, but cannot be used as a reference picture itself.

Each slice 332 is a portion of an image, normally coded independently from the other slices of the picture so as to allow for error confinement. Hence, in the event that an error in the bit stream is detected, the graphics chipset 120 of FIG. 1 can try to continue its decoding operations by looking for the next slice header.

As further shown in FIGS. 3A and 3B, each slice 332 is a combination of a slice header 340 followed by one or more macroblocks 342. A "macroblock" 342 is a smaller portion of an image such as 16×16 group of pixels for example. At this state of the parsing operations, motion compensation and prediction are performed using a motion vector, especially for video content.

Each macroblock 342 includes a macroblock header 350 followed by one or more blocks 352. Each block 352 includes a Discrete Cosine Transform (DCT) coefficient 360 followed by run-level variable length coefficients 362. DCT is used to remove spatial correlation existing among adjacent pixels and also to remove subjective redundancy. The end of block 352 is denoted by an end-of-block parameter 364.

Referring back to FIG. 2, as shown in 206, a sign mask 240 (normally a 8×8 matrix) is applied to each block of the MPEG-2 bit stream 202 by Exclusively OR'ing (XOR'ing) the signed bit of the DCT coefficient. Thereafter, the modified DCT stream is returned back to a MPEG-2 bit stream 208, but is now scrambled (referred to as the "scrambled bit stream"). The scrambled bit stream 208 is output to logic 210 such as a DirectX Video Acceleration Application Programming Interface (DxVA API) 210 as described in the publication entitled "Microsoft DirectX VA: Video Acceleration API/DDI" (Jan. 23, 2001). This is accomplished by software module 200 initiating a function call (IAMVideoAccelerator::Execute). The function call includes parameters such as pointers to one or more data buffers that contain scrambled bit stream 208. The operating system translates the function call into a driver call that retrieves the scrambled bit stream contents for access by the software driver 220.

Figure 4:
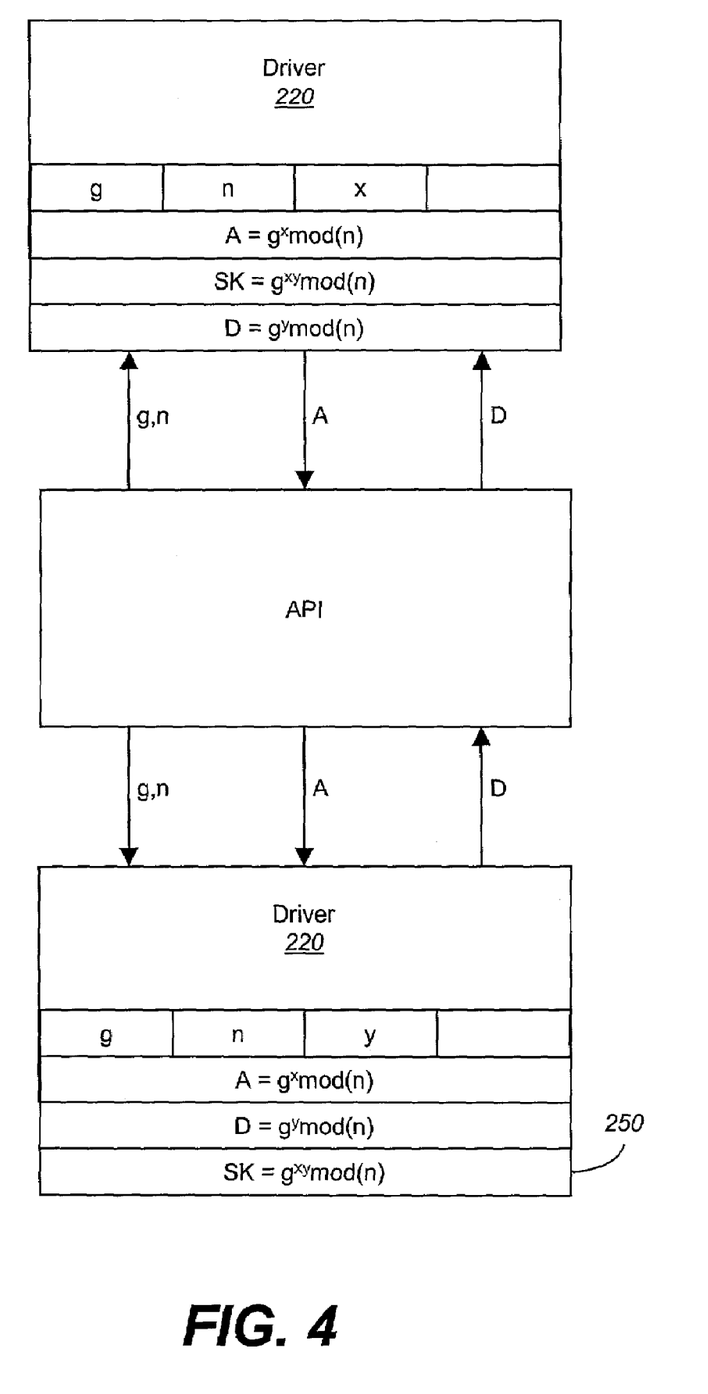
FIG. 4 is an exemplary embodiment of the operations of the electronic system to obfuscate the sign mask.

Additionally, using a Diffie-Hellman key exchange methodology, a shared secret key (SK) 250 is computed for use by both the software module 200 and the software driver 220 as described in FIG. 4. Using the shared secret key 250, the sign mask 240 is encrypted. For example, the sign mask 240 may be XOR'ed with the shared secret key 250 or a selected portion thereof. The encrypted sign mask 260 is output to the software driver 220 via the DxVA API 210 as well. For instance, software module 200 will initiate an a function call (IAMVideoAccelerator::Execute) and set a pointer ("lpPrivateInputData" pointer) to one or more data buffers for passing the encrypted sign mask 260. The operating system translates the function call into a driver call that retrieves the encrypted sign mask 260 for the software driver 220. Additionally, another pointer ("lpPrivateOutputData" pointer) is adapted to point to an area where data is to be returned to the software module 200.

For this embodiment of the invention, at the software driver 220, the encrypted sign mask 260 will be decrypted using the shared secret key 250. The sign mask 260, therefore, will be transferred between the software module 200 and driver 220 in an encrypted form to prevent third parties from more easily obtaining such information. Of course, it is contemplated, that the sign mask 240 used by software module 200 to produce scrambled bit streams 208 may be encrypted and subsequently decrypted by the graphics chipset 120 of FIG. 1 in lieu of by software driver 220.

Referring now to FIG. 4, one embodiment of Diffie-Hellman operations performed in part by a utility software routine of the software module 200 of FIG. 2 is shown. This operation generates the shared secret key 250 between the software driver 220 and the software module 200 is shown. The shared key 250 can be altered periodically, thereby allowing software module 200 and software driver 220 to update their shared key used to scramble the sign mask at certain time intervals. For this embodiment of the invention, the software module 200 is configured to decide the interval for altering the shared secret key 250. This interval may be a fixed time interval or random in nature.

The authentication may be performed through handshake signaling between the software module 200 and the software driver 220 using the DxVA API 210. This avoids "man-in-the-middle" attacks.

For instance, in one embodiment of the invention, the software module 200 and software driver 220 agree upon two prime numbers, g & n, where "g" is a primitive root of "n". A utility software routine 400 of the software module 200 selects a random value "X" and computes a value $A = g^X \cdot mod(n)$. This value "A" is routed to the driver 220. The driver 220 also selects a random number "Y" and sends software module 200 the value $D = g^Y \cdot mod(n)$. The agreed shared secret key (SK) is determined to be the following as shown in equation (1).

$$SK = A^Y \cdot mod(n) = D^X \cdot mod(n) = g^{XY} \cdot mod(n). \quad (1)$$

Figure 5:
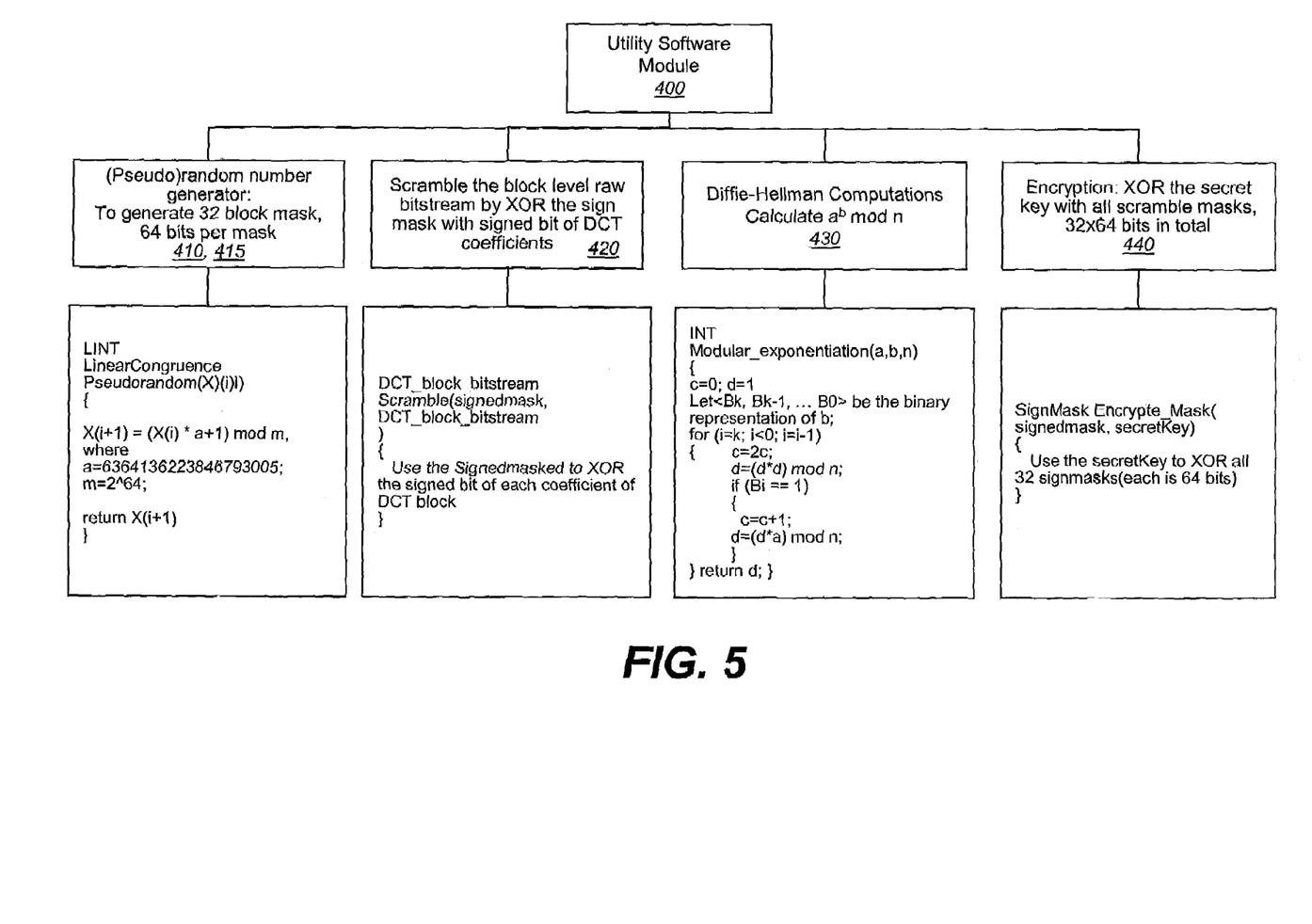
FIG. 5 is an exemplary embodiment of the software modules forming the utility software controlling the obfuscation of the sign mask.

Referring to FIG. 5, the utility software routine 400 controls (i) generation of the sign masks 410, (ii) scrambling of the DCT coefficient sign bit in the raw bit stream 420, (iii) performance of the Diffie-Hellman key exchange 430, and (iv) encryption of the sign masks 440.

In particular, with respect to generation of the sign masks, the utility software routine 400 comprises a number generator 415 (e.g., random number generator or pseudo random number generator), which produces 64-bit sign masks. For instance, thirty-two (32) sign masks may be produced in support of MPEG-2 data scrambling as shown in Table A. In one embodiment of the invention, pseudo random number generator 415 may be implemented using a Linear Congruence Algorithm. The pseudo code for the pseudo random number generator 415 is shown in Table B.

TABLE A

| Bits 31:16 | Bits 15:0 |
|---|---|
| SignMask [15:0] [0] [1] | SignMask [15:0] [0] [0] |
| SignMask [15:0] [0] [3] | SignMask [15:0] [0] [2] |
| . | |
| . | |
| . | |
| SignMask [15:0] [7] [7] | SignMask [15:0] [7] [6] |
| SignMask [31:16] [0] [1] | SignMask [31:16] [0] [0] |
| SignMask [31:16] [0] [3] | SignMask [31:16] [0] [2] |
| . | |
| . | |
| . | |
| SignMask [31:16] [7] [7] | SignMask [31:16] [7] [6] |

TABLE B

```
LINT
LinearCongruence_
Pseudorandom (X (i)i)
{
X(i+1) = (X(i)*a +1)mod m, where
a = 6364136223846793005;
m = 2^64
Return X(i+1)
}
```

With respect to scrambling of the DCT coefficient sign bit in the raw bit stream, in one embodiment of the invention, the utility software routine 400 performs XOR operations on the generated sign mask with signed bit of DCT coefficients. The pseudo code for the scrambling operations are shown in Table C.

TABLE C

```
DCT_block_bitstream
Scramble(signedmask, DCT_block_bitstream)
{
signedmask XOR signed bit of each coefficient of DCT block
}
```

With respect to performance of the Diffie-Hellman key exchange, this involves modulo computations. As generally stated above, utility software routine 400 in cooperation with software module 200 computes the value $A = g^X \cdot mod(n)$, where "X" is a randomly generated number. The utility software module 400 in cooperation with software driver 220 computes a value $D = g^Y \cdot mod(n)$, where "Y" is a randomly generated number. Such values (A,D) are used to produce the secret key (SK) equal to $A^Y \cdot mod(n)$ or $D^X \cdot mod(n)$, namely $g^{XY} \cdot mod(n)$, where "g" and "n" are prime numbers agreed to be used by software module 200 and software driver 220. The pseudo code for the operation of modulo mathematics in Diffie-Hellman key exchange operations is shown in Table D.

TABLE D

```
INT
Modular_exponentiation(a,b,n)
{
c=0; d=1;
Let <Bk, Bk-1 . . . B0>be the binary representation for b
For (i=k; i<0;i=i-1)
{     c=2c;
      d=(d*d)mod n;
if (Bi=1)
{
      c=c+1;
      d=(d*a)mod n;
}
} return d; }
```

With respect to encryption of the sign masks, it is contemplated that a XOR operation is conducted on both the shared key and all signed masks. For example, the shared key is XOR'ed with thirty-two sign masks, each being 64-bits in length. The pseudo code for the encryption operations are set forth in Table E.

TABLE E

```
SignMask Encrypted_Mask (signedmask, sharedkey)
{
sharedkey XOR signedmask
}
```

While this invention has been described in terms of several illustrative embodiments, this description is not intended to be construed in a limiting sense. Various modifications of the illustrative embodiments, as well as other embodiments of the invention, are deemed to lie within the spirit and scope of the appended claims.

What is claimed is:

1. A method comprising:
   computing a key shared by a plurality of software modules employed within an image display device;

encrypting a sign mask with the shared key, the sign mask being used for scrambling at least one bit stream, the bit stream being a video stored in a compressed format;

transmitting the scrambled bit stream along with the encrypted sign mask between logic; and decrypting the encrypted sign mask to descramble the scrambled bit stream.

2. The method of claim 1, wherein the scrambled bit stream is transmitted from a first software module of the plurality of software modules to a second software module of the plurality of software modules.

3. The method of claim 2, wherein the computing of the shared key comprises computing a first random value by the first software module;

computing a second random value by the second software module;

computing a first result by using the first random value as an exponential factor for a first prime number previously agreed upon by the first and second software modules multiplied by a result of a modulo operation performed on a second prime number previously agreed upon by the first and second software modules;

computing a second result by using the second random value as an exponential factor for the first prime number multiplied by a result of a modulo operation performed on the second prime number; and multiplying the first result by the second result.

4. The method of claim 2, wherein the computing of the shared key comprises computing a first random value by a software utility module in communication with the first software module and the second software module;

computing a second random value by the software utility module in communication with the first software module and the second software module;

computing a first result by using the first random value as an exponential factor for a first prime number previously agreed upon by the first and second software modules multiplied by a result of a modulo operation performed on a second prime number previously agreed upon by the first and second software modules;

computing a second result by using the second random value as an exponential factor for the first prime number multiplied by a result of a modulo operation performed on the second prime number; and multiplying the first result by the second result to compute the shared key.

encrypting a sign mask with the shared key, the sign mask being used for scrambling at least one bit stream.

5. The method of claim 1, wherein the encrypting of the sign mask comprises:

performing an exclusive OR (XOR) operation between data bits forming the sign mask and data bits forming the shared key.

6. The method of claim 1, wherein the encrypting of the sign mask comprises:

performing an exclusive OR (XOR) operation between data bits forming the sign mask and a number of data bits that partially form the shared key.

7. The method of claim 1, wherein the bit stream is stored as a MPEG-2 video.

8. The method of claim 2 further comprising: updating the shared key by the plurality of software modules after a fixed time interval has elapsed.

9. The method of claim 2 further comprising: randomly updating the shared key by the plurality of software modules.

10. An image display device comprising:

a software driver; and a software module in communication with the software driver, the software module to encrypt a sign mask with a shared key known by the software driver and to transmit a scrambled bit stream along with the encrypted sign mask to the software driver.

11. The image display device of claim 10 further comprising:

a utility software module to compute the shared key by performing arithmetic operations on values provided by both the software module and the software driver.

12. The image display device of claim 10, wherein the software driver to decrypt the encrypted sign mask with the shared key to recover the sign mask in clear form.

13. The image display device of claim 12, wherein the software driver to descramble the scrambled bit stream using the sign mask in clear form.

14. The image display device of claim 10, wherein the software module encrypting the sign mask by performing an exclusive OR (XOR) operation between data bits forming the sign mask and data bits forming the shared key.

15. The image display device of claim 10, wherein the software module encrypting the sign mask by performing an exclusive OR (XOR) operation between data bits forming the sign mask and a number of data bits that partially form the shared key.

16. An image display device comprising:

a first logic; and a second logic in communication with the first logic, the second logic to encrypt a sign mask with a shared key known by the first logic and to transmit a scrambled bit stream along with the encrypted sign mask to the first logic, both the first and second logic to update the shared key after a fixed time interval has elapsed.

17. A software embodied in a machine-readable medium and executable by a processor, comprising:

a first software module to encrypt a sign mask with a shared key known by an intended receiver of the sign mask;

a second software module to output a scrambled bit stream along with the encrypted sign mask;

a third software module associated with the intended receiver to decrypt the sign mask with the shared key; and a fourth software module associated with the intended receiver to recover a raw bit stream from the scrambled bit stream using the decrypted sign mask, the third and fourth software modules partially form a software driver employed within an image display device.

18. The software of claim 17, wherein the first and second software modules partially form a digital versatile disk (DVD) software application employed within the image display device.

19. A system comprising:

a port;

a content playing device to provide;

a graphics chipset; and a software module in communication with the graphics chipset and configured to receive the bit stream of data from the port, the software module to encrypt a sign mask with a shared key known by the graphics chipset and to transmit a scrambled bit stream along with the encrypted sign mask to the graphics chipset.

20. The system of claim 19, wherein the graphics chipset to decrypt the encrypted sign mask with the shared key to recover the sign mask in clear form.

21. The system of claim 20, wherein the graphics chipset to descramble the scrambled bit stream using the sign mask in clear form.

22. The system of claim 20, where the software module encrypting the sign mask by performing an exclusive OR (XOR) operation between data bits forming the sign mask and data bits of the shared key.

* * * * *